(12) United States Patent
Michel

(10) Patent No.: US 6,218,620 B1
(45) Date of Patent: Apr. 17, 2001

(54) HOUSING FOR TELEPHONE SPLICES AND THE LIKE AND METHOD

(76) Inventor: John M. Michel, 105 Evergreen Dr., Coatesville, PA (US) 19320

(*) Notice: Subject to any disclaimer, the term of this patent is extended or adjusted under 35 U.S.C. 154(b) by 0 days.

(21) Appl. No.: 09/314,840

(22) Filed: May 19, 1999

(51) Int. Cl.[7] .................................................. H02G 7/06
(52) U.S. Cl. ............................................................ 174/92
(58) Field of Search ............................ 174/92, 93, 138 F, 174/76

(56) References Cited

U.S. PATENT DOCUMENTS

| | | | |
|---|---|---|---|
| 3,861,422 | * | 1/1975 | Christie .............................. 174/92 X |
| 3,992,569 | * | 11/1976 | Hankins et al. ....................... 174/92 |
| 4,095,044 | * | 6/1978 | Horsma et al. .................... 174/138 F |
| 4,818,824 | * | 4/1989 | Dixit et al. .............................. 174/92 |
| 4,865,893 | * | 9/1989 | Kunze et al. ....................... 174/92 X |
| 4,875,952 | * | 10/1989 | Mullin et al. ....................... 174/92 X |
| 5,245,133 | * | 9/1993 | DeCarlo et al. ....................... 174/93 |
| 5,331,114 | | 7/1994 | Rudolph .................................. 174/93 |
| 5,525,756 | * | 6/1996 | Mullaney et al. ....................... 174/92 |

OTHER PUBLICATIONS

Two page brochure or catalogue sheet headed, Raychem XAGA®1650, subtitled, "Buried Nonpressuried Splice closure System" No date.
Pressure Encapsulated Apparatus Kit (Peak)—Commercial sales brochure from PSI Telecommunications, Inc., 1989.

* cited by examiner

Primary Examiner—Kristine Kincaid
Assistant Examiner—Chau N. Nguyen
(74) Attorney, Agent, or Firm—Dann Dorfman Herrell & Skillman; John C. Dorfman, Esq.

(57) ABSTRACT

An elongated waterproof enclosure for spliced telephone cables is provided by a two-part molded resinous housing that provides openings for one or more cables at opposite ends. A one piece resilient sealing gasket includes longitudinally slitted tubular gaskets at the ends to snugly receive individual cables side by side. The grommets at each end are formed integrally and connected by flat connecting pieces arranged to be transverse to opposed narrow edges of the mating opposed housing portions. The narrow edges when clamped together pinch and seal the flat pieces. Housing ends conforming to the grommets also have opposed narrow edges which, when clamped together, pinch the grommets and provide a seal. The housing pieces are preferably connected along one side by an integral molded hinge offset from the opposed longitudinal edges to give the seal clearance. At the opposite side of the housing, offset from the edges, are rigid flanges molded integrally with the housing parts. The flanges lie generally parallel to one another when the housing is closed. Urged together by suitable clamping device, the flanges apply pressure to urge the opposed narrow edges together and into the gasket. A preferred clamping device is a channel-like member having cam elements on the opposed inside walls of the channel cooperating with cam elements on the flanges. A tubular port is provided through one of the housing parts and preferably provided with a closure which is piston-like and seals against the sidewalls of the cylindrical tubular port. Structure to draw the piston into the housing is connected between the piston and the housing. As the piston is drawn into the port against the insulating fluid filling the housing parts, the piston imposes pressure on the fluid to fill small spaces within the housing. A thinner part of the housing wall provides a pressure gauge designed to be forced outwardly as a protruding bubble when the pressure is sufficient to fill the voids as desired.

41 Claims, 6 Drawing Sheets

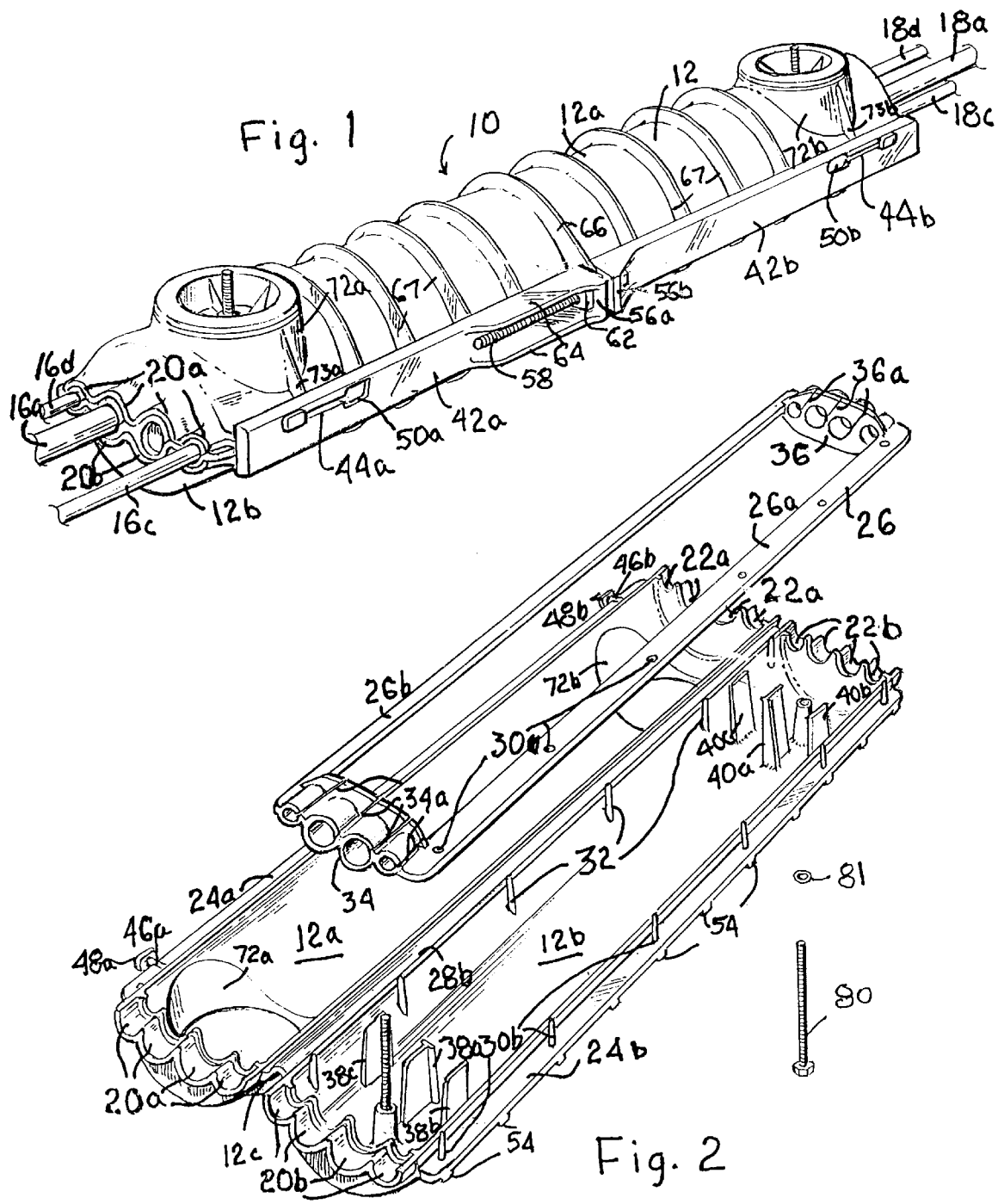

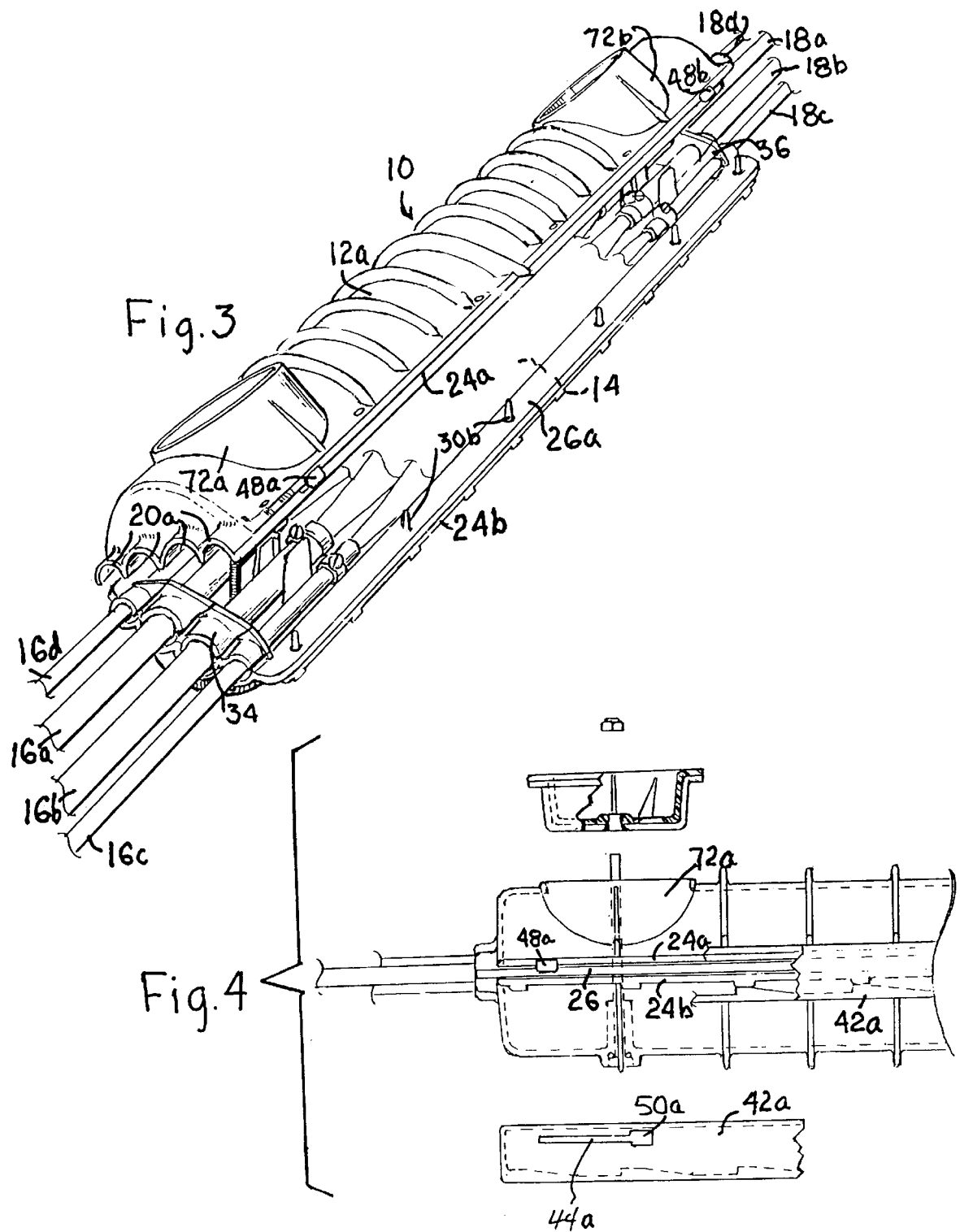

HOUSING FOR TELEPHONE SPLICES AND THE LIKE AND METHOD

THE NATURE OF THE INVENTION

This invention relates to a telephone line splice enclosure which with little change is suitable for use with buried cable, underground conduits or suspended cables. Telephone cables may each include many wires and sometimes many cables are involved in a single splice. The enclosure of the present invention is preferably made large enough to accommodate splices of any sizes and provides sufficient openings for receiving multiple cables at each end.

BACKGROUND OF THE INVENTION

For many years splicing of telephone cables has been a job requiring accuracy and the patience of a skilled technician. Particularly if the splice of the connected cables is to be buried, special precautions need to be taken to make sure that the many electrical connections made within the splice are protected from moisture, dirt and atmosphere which might attack and destroy one or more of the connections. Any such failure can cause problems requiring unearthing the splice, repairing interrupted connections and redoing the splice protection.

In order to minimize problems, prepared splice enclosures have been developed having disk-like end walls which preferably are made of rubber and have holes into which the cables are fit, usually through lateral self-closing slits. Once the splice is completed, it is carefully wrapped and placed within an enclosure extending to and wrapped around the end walls through which the cables pass. Various materials are used to impregnate the splice by pouring insulating fluid or semi-fluid material intended to keep the splice covered and exclude water from the splice enclosure and keep its various connections dry. The splice may be further wrapped if desired, particularly if it is buried. Even though such a splice is done very well by highly skilled people, its life expectancy is very short, and replacement is commonly required within a year or two years.

THE NATURE OF THE PRESENT INVENTION

The present invention relates to a greatly improved protective enclosure for a splice of telephone lines, and the like. The splice itself is made in a conventional way and the enclosure can be used over a new or an old splice. The enclosure is a preformed housing of a molded thermoplastic resinous material, which may be preferably a resin of the Olefin family, a high density polyethylene or possibly polypropylene. The housing consists of mating hollow parts which may, or may not, be joined together by an integral hinge along adjacent elongated edges of each of the mating pieces. The elongated hollow housing part are brought together to enclose the completed splice. The housing parts are sealed together preferably by a continuous resilient gasket which provides a sealing ring between the opposed edges of the mating parts around the entire periphery of the housing including integral side by side tubular grommets at each end. Opposed housing edges are formed at the ends with scalloped edges which provide openings to receive multiple grommets molded together in the side by side position which seal against the cables, through adjacent round openings, intermediate sized grommets or plugs. The grommets are integral and with the rest of the gasket. A grommet tube in the gasket if too large to seal against a cable may employ an intermediate grommet between it and the cable. If a particular tube is unused it may be plugged. Where multiple cable bundles are involved each cable is preferably provided with its own preformed grommet passage, usually through one of multiple adjacent openings in the ends of the housing. Cables are placed in the grommets through lateral slits which permit opening the grommet to insert the cables. During use, the grommets are held tightly around the cable by pressure from the housing parts which serve to compress the gaskets against the cable and seal each access slit fluid tight. Alternatively, the scalloped form of the ends of the housing may be avoided by using and oval structured integral gasket with separate grommet tunnels for the individual cables, each accessed by lateral slits, but such structures are more awkward in use.

At least one port opening, and preferably two, located at opposite ends of the housing, is provided to permit pouring of insulating fluid material into the housing to fill the space within the housing and all voids in the cable splice. The fluid material is commonly a thermoset rubber which may be a polyurethane material which will solidify within a short time, commonly about half an hour, and up to an hour at colder temperatures. This material later can be easily broken up for access to the splice, as is well-known in the art.

In non-buried application, as will be explained below, filling every space between the conductors and in the splice may not be necessary. But in buried applications and often in others pressurizing the fluid to fill the voids is needed. For this purpose, the port closure may be a pressure applying piston.

A piston is preferably provided at each filling port opening to fit snugly within the port opening. The opening preferably presents a generally cylindrical surface over at least a piston operating portion near the outer edge into which pistons move. These pressure applying pistons, or plungers are moved inward against pressure of the insulating fluid by screws or similar adjustable connectors extending across the housing. Each screw connector draws fastener draws the pistons into the housing and in the process presses the fluid within the housing into voids within the splice.

A gauge may be provided to indicate when adequate pressure has been achieved. A novel pressure gauge can be built into the thermoplastic walls of either the piston or the housing. Such a gauge may consist of a sheet of resilient material fixed wall portion of the housing over a hole in the wall or may be a flat inwardly protruding bubble in the thermoplastic material of the housing. The gauge which is forced to bow outwardly by the pressure. When applied by the piston the bubble is part of the housing, it is normally thinner than the rest of the housing. In either event the nature of the material, and particularly its thickness, size, and strength will be so selected that it will be driven outwardly at a designed pressure sufficient to force the fluid into the voids between conductors in each cable to cause the bubble to protrude outwardly so as to be easily observed. Alternatively, a gauge may employ other material, typically resilient rubber-like which is substituted in a hole through the wall. It is of considerable advantage to locate designed pressure detectors in the piston so that will be recessed within the port where it is more protected from possible outside damage, such as back filling in buried applications.

More specifically, the present invention concerns a telephone line spice enclosure for excluding moisture from the enclosed splice. The enclosure comprises a two part hollow housing sufficiently large to enclose the splice. The two parts of the housing fit together for enclosing the splice of multiple telephone lines from two or more cables passing through cable openings provided in the enclosure, normally at opposite ends of the housing. An elastomeric resilient gasket is designed to fit between cooperating edges of the two housing parts and extends around the full periphery of the cooperating edges such that compression of the gasket between the two parts will seal the interior of the housing. The gasket preferably includes integral grommet members at cable openings in the housing for accommodating passage of cables and sealing them in place. Clamp means are used to bear against the housing parts and urge them together against the gasket to complete a seal.

Preferably the housing is composed of molded resinous material, such as high density polyethylene. In a preferred embodiment the hollow opposing housing parts and a connecting hinge are molded as an integral piece. The opposing parts have opposed mating edges between which a resilient sealing gasket of rubber, or like resilient material, is provided. In a preferred embodiment the edges of the opposite side from the hinge have integral flanges parallel to one another in closed position and slightly offset from the edges. A channel clamp which may be molded from polycarbonate material, engages the flanges. Multiple cooperating cam members are provided along an outer surface of at least one of the flanges and the opposed inner wall of the channel. One of the opposed surfaces, such as the flange, may have opposing ramps or cams or merely spaced abutments or posts to cooperate with the cams. Opposing ramp cam structure cooperate with the spaced abutments as the channel is moved along the flanges to drive the flanges together. Moving the flanges together will compress the gasket to complete the seal around the periphery of the housing parts.

The housing also preferably provides at least one, and preferably two, filling ports at opposite ends of the housing. Through the ports a highly insulating fluid, such as urethane rubber, is poured to cover the cables and splice and preferably fill voids between the conductors within the conductors with cables and within the splice in order to prevent the intrusion of water. The ports are closed to contain the fluid. Preferably piston means are employed as the port closures are drawn tightly into the housing to further pressurize the fluid to assure that all voids are filled.

A bubble pressure gauge may be provided in a housing wall or piston wall. The properties of the bubble material are selected so that, at sufficient pressure to cause insulating fluid within the housing to fill voids in the splice, the bubble will pop outward.

BRIEF DESCRIPTION OF THE DRAWING

FIG. 1 is a perspective view of the telephone line spice enclosure after the splice has been enclosed and the housing sealed, filled with fluid and pressure imposed.

FIG. 2 is a perspective exploded view of an open housing and sealing gasket assembly for the structure shown FIG. 1 without the cables and splice in place.

FIG. 3 is a perspective view of the housing of FIG. 2 with a splice within the casing and cables in place within the grommets provided in the gasket ready for the housing to be closed.

FIG. 4 is a partial exploded view of one end with the housing closed and the splice in place as in FIG. 1 showing port open and the structure of the cam sealing slide broken away, with the broken part moved down below the structure.

A DETAILED DESCRIPTION OF THE EMBODIMENTS SHOWN IN THE DRAWINGS

Figure 5:
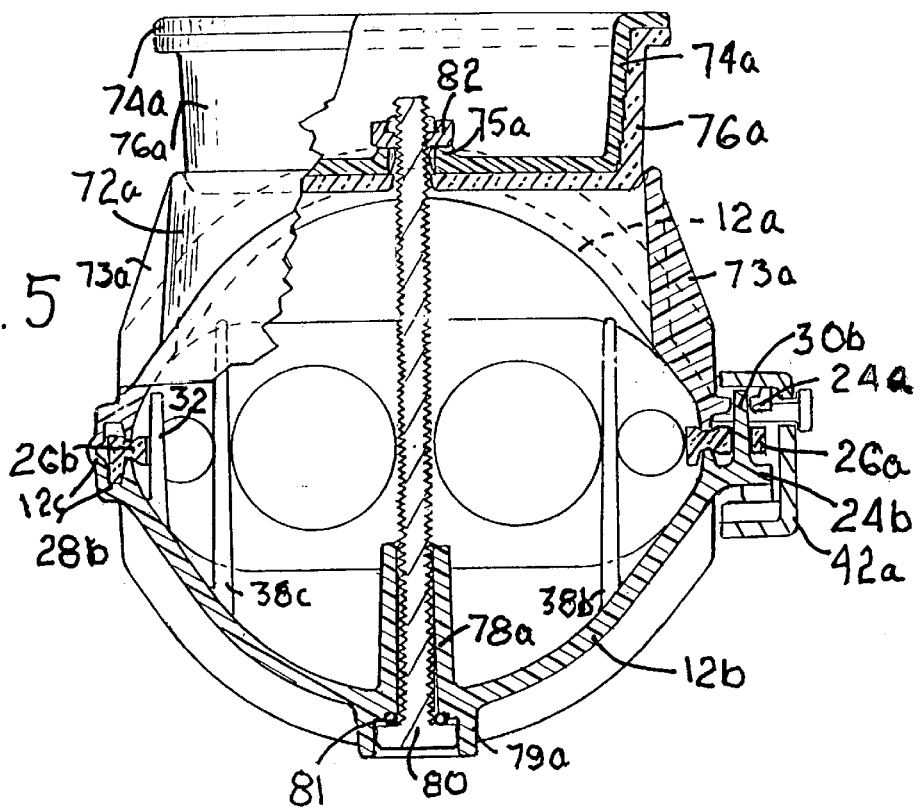
FIG. 5 is an enlarged partial sectional view across the housing laterally at the center of a port with the piston closure ready to be tightened.

FIG. 1. shows a telephone line splice enclosure closed and with cables and splice enclosed and the procedure completed for sealing the housing for excluding moisture from the enclosed splice. The structure shown, while intended to be buried, may be used in another environment. The enclosure generally designated 10 comprises the housing 12 which is preferably composed of molded resinous material such as high density polyethylene and consists of an upper hollow housing part 12a and lower hollow housing part 12b. The two parts of the housing 12a and 12b may be separate from one another, but are preferably connected by an integral molded hinge 12c of the same material as the housing as shown in FIG. 2. Although the splice need not be shown in detail in the drawings, because the splice itself is conventional, its location 14 within the housing is indicated in FIG. 3. In the region 14 the splice is made up of individual connections of pairs of conductors from different cables 16a, 16b, 16c and 16d entering one end of the housing through holes formed by scalloped ends 20a, 20b, and cables 18a, 18b, 18c, and 18d entering the other end through holes formed by scalloped ends 22a, and 22b, 22c and 22d. The conductors may be of any conventional type, including fiber optic light conductors. The two groups of cables enter the housing from the opposite ends. Because the housing is relatively rigid respective, opposed scalloped curved portions 20a and 20b and 22a and 22b at the opposed end edges of each housing part provide cable openings as seen again in FIG. 2. The openings seen in FIG. 1 embrace the respective cables 16a, 16b, 16c and 16d. The structure embracing the cables is similar at the other end. The hinge 12c is connected to the respective housing parts 12a and 12b at points somewhat offset from the generally straight edges on one side of the housing. So that when closed the hinge is spaced from the edges. Integrally molded flanges 24a and 24b, respectively, are also offset from the generally straight edges at the other side of the housing are as seen in FIG. 3, as the housing parts close about hinge 12c, the flanges 24a and 24b move toward positions parallel to one another as the housing is closed. As seen in FIG. 4, by virtue of having the flanges and hinge connections slightly offset from the edges of the housing, the actual narrow edges, engage and seal against the gasket 26. As seen in FIG. 2, gasket 26 is positioned above the housing part 12b before the gasket is put in place. At that time the splice and the cables would be in position in the gasket for assembly to the housing.

Gaskets 26 used in connection with the sealing of housing parts 12a and 12b may take many forms. The one shown and described herein has been tailored for the specific housing structure employed. Variations from this specific configuration will occur to those skilled in the art and will be dictated by the cable sizes and shapes. It is possible but uncommon to have cables enter at only one end. It is even possible to have cable entry positions at various angles instead of being opposed.

Figure 6:
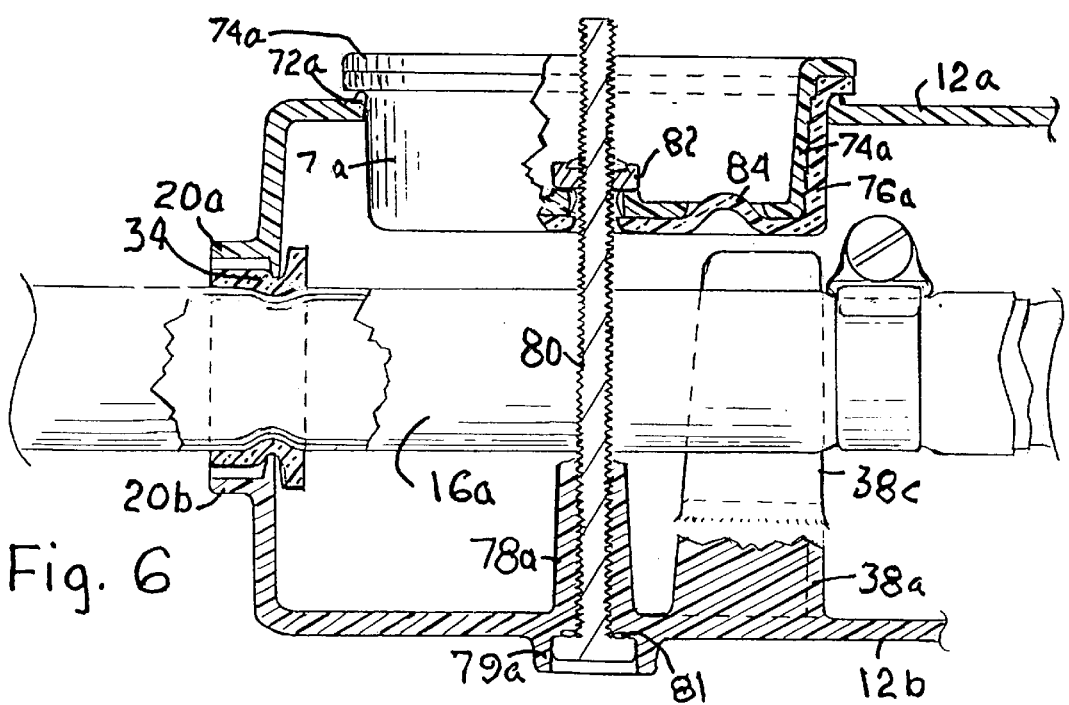
FIG. 6 is an enlarged partial axial sectional view across the housing taken transversely to FIG. 5 showing one of the closures partially broken away to show the multi-layer construction and with the piston closure drawn into closed position.

The gasket in this case includes generally parallel elongated pieces 26a and 26b. Piece 26a is relatively flat but piece 26b is angled in section as the result of compression as seen in FIG. 5. Both elongated members are designed to be supported initially on the housing edges, including those extending above both flange hinge and channel 28b, and flanges 24a and 24b, as well as the scalloped edges of the ends of housing parts. As seen in FIG. 2, flat strip 26a has holes 30a designed to engage alignment pins 30b on flange 24b to properly position strip 26a. Angled strip 26b has a flange to extend into the groove along the hinge at the edge of housing 12b. FIG. 5 better shows the differences in cross sectional shapes of the elongated pieces 26a and 26b. Piece 26b is somewhat narrower than 26a and flanged to extend into the grove in the hinge at the edge of housing 12b. The pins 32 are spaced periodically along the length of the inner edge of flange to hold strip 26b in desired position. The gasket ends 34, 36 are molded to form integral adjacent tubular grommets with tubular passages for cables such as 16a, 16b, 16c, 16d and 18a, 18b, 18c and 18d, respectively, as seen in FIG. 3. The tubular portions of end 34 conform to the holes provided by opposed scalloped edges 20a and 20b and housing parts 12a and 12b. Similarly, the scalloped parts 22a and 22b at the other end of housing parts 12a and 12b, respectively, engage the tubular portions in end 36 of gasket 26. Each of the tubular grommets in end wall 34 is provided with a slit 34a, 36a which is normally closed but permits each of the tubular grommets elements to be opened to move a cable laterally into the grommet as needed. Slits 36a are provided in portion 36 for the same purpose. FIGS. 1 and 4 show the housing closed against the sealing means 26. FIGS. 5 and 6 give further insight into what occurs between the edges and the respective parts of the gasket. It will be seen for example in FIG. 5 that despite the fact that gasket 26a lies between the flanges 24a and 24b it is the relatively narrow edges of housing portions 12a and 12b which engage and clamp against the inside edge of the gasket 26a. FIG. 5 also shows that the hinge 12c between the housing portions 12a and 12b is somewhat offset from the housing portions in closed position, thereby leaving room for the gasket strip 26b. The attachment of the hinge portion 12c is not to the edges of the enclosure portions 12a and 12b but to the outside surfaces somewhat offset from the edges. Thus, room is left for the edges on the hinged side of the housing serve to squeeze the gasket. As seen FIG. 6, the same sort of phenomenon takes place. The joined tubular end portions 34 and 36 connecting the strips 26a and 26b as seen in FIG. 6 are not engaged by the molded tubular scalloped portions 20a and 20b but each scalloped edge of the housing portions 12a and 12b provides a similar slightly smaller coaxial scallop forming a narrow edge which engages and pinches the walls of the tubular grommet members in end part 34a (and 34b at the opposite end of the housing).

The opposed narrow edges at the scalloped edges at both ends of the housing as seen in FIG. 2, continue around both housing parts 12a and 12b to provide opposed narrow edges along the straight elongated edges of the housing 24b and 24a, and at opposite edges of the hinge 28b as well as at the scalloped ends. The straight opposed narrow edges thus engage and pinch the portions 26a and 26b of the continuous gasket, as well as the grommets within the scalloped edges at each end 20a and 20b and 22a and 22b to pinch and seal the gasket continuously around its entire length.

Also projecting upwardly from the bottom portion 12b of the housing there may be provided a number of dividers as 38a, 38b, 38c at one end and 40a, 40b and 40c at the opposite end. The dividers help direct cables once inside the housing. Because of the curved shaped of the housing the dividers 38a and 40a are taller. Also the center dividers have a T-shaped cross-section with the crossbar of the T extending across the casing to aid in keeping the cables away from the screw structure, which will be described below. The dividers also perform the function of providing an anchor to the housing for the cables. Various structures may be added to the cables but a simple hose clamp 37 tightened in place and positioned to engage one or more of the dividers will hold the cable against any tendency to slip out of the housing and take the stress load offjunctions in the splice.

In order to hold the housing parts in closed position a pair of molded channel shaped clamp numbers 42a and 42b, preferably of a polycarbonate, as seen in FIG. 1 are employed when the housing parts 12a and 12b are brought together with the gasket 26 in place as shown FIG. 4. The channel pieces 42a and 42b may be slipped over the flanges 24a and 24b. Each of the channels has a slot 44a and 44b, respectively, in the bottom of the channel. A pair of guide pins 46a and 46b extending outward from the edges of flange 24a are fixed to the flange or may cast in place. Each pin has at its outer end an enlarged head 48a and 48b, respectively, which is spaced from the flange at least the thickness of the bottom of the channel clamps 42a and 42b through which it must extend. As channel clamp 42a is put in place, head 48a passes through the opening 50a. As channel 42b is put in place, head 48b passes through opening 50b.

Figure 7:
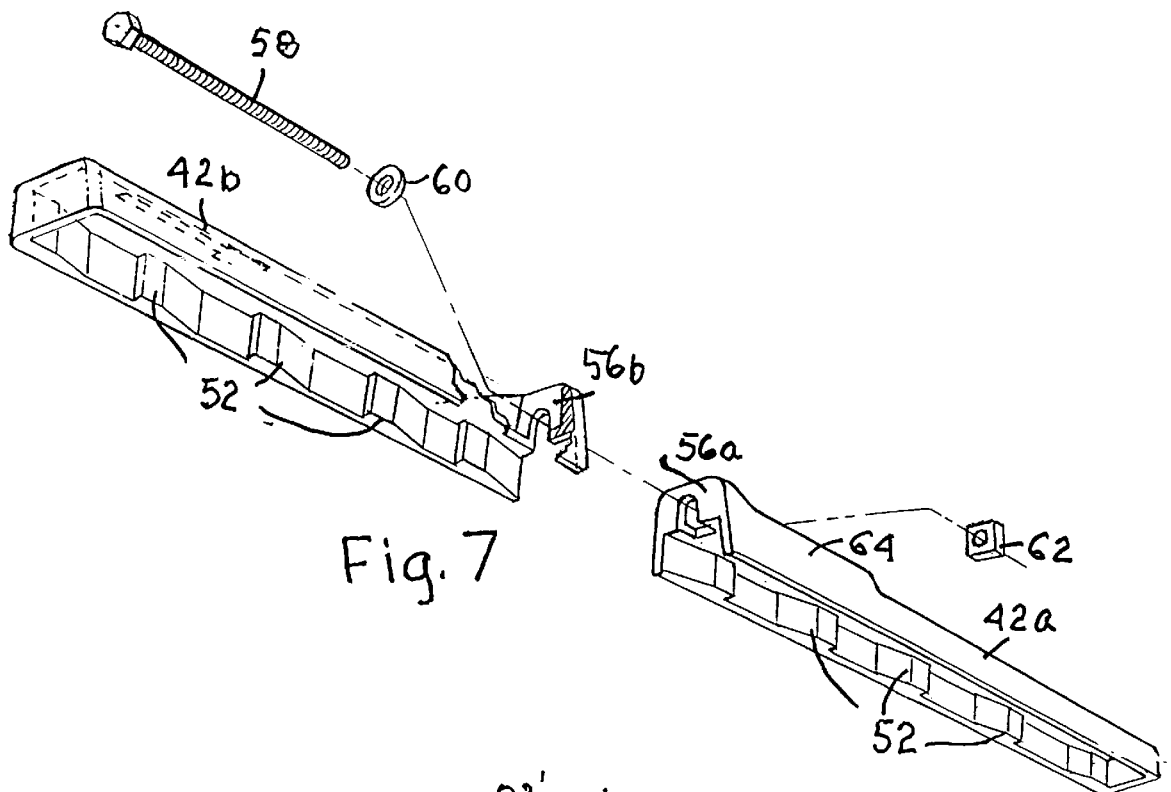
FIG. 7 is offset from operational position (indicated by construction lines) is a perspective view of the channel slide clamp members showing the cam portions and an adjustment bolt and nut used for drawing the slides together so that the cams become operative offset from its operational position (indicated by construction lines).

The channel clamps 42a and 42b, as seen in FIG. 1, are in their final position having drawn the flanges 24a and 24b together, so that acting against the hinge 12c the clamps press housing parts 12a and 12b together. The clamping causes compression of the gasket 26 around its entire periphery by the various edges of the housing parts 12a and 12b. As can be seen, particularly in FIG. 7, the sidewalls of each of the channels 42a and 42b are intended to bear against the flanges 24a and 24b. Each top sidewall bearing against flange 24a in the embodiment shown is plane, and simply fits flat against and over the sidewall. The bottom sidewall of each channel, however, is provided with a series of bosses 52 in the form of an inclined plane and a parallel platform. The inclined planes of the bosses 52 are intended to work against fixed abutments or pins molded as part of the bottom flange 24b. The placement of inclined planes on the flange 24b opposed to those on the channel side wall will also work. Also if such inclined plane abutments or pins may be used on the channel sidewall. It will be observed that the inclined planes in channels 42*a* and 42*b* are oppositely directed. When the channels are put in place they must align the enlarged opening 50*a* or 50*b* of the slot 44*a* or 44*b* with the enlarged head 48*a* or 48*b* of pin 46*a* or 46*b*. By doing this the channels may be moved into the edges of the flanges 26*a* and 26*b* in positions in which the inclined planes and abutments do not engage. The channels 42*a* and 42*b* are aligned but widely separated from one another. The ends of the channels 42*a* and 42*b* in closest proximity are provided with heavy outward projecting flanges having unthreaded aligned bolt holes. Through the aligned holes extends a bolt to 58 with a washer 60 in place against the bolt head. After passing through both holes the bolt is engaged by a nut 62. The bolt is partially shielded by channel sidewall 64 which may be of such dimension as to engage parallel edges of the nut and prevent it firom turning as the bolt 58 is turned. As the bolt is turned clockwise the channels 42*a* and 42*b* are drawn together. Channel travel is limited in the travel by the length of slots 44*a* and 44*b* and intrusion of a central transverse strengthening rib 66. Additional parallel strengthening ribs 67 may be added to the outer surfaces of both parts of the housing 12*a* and 12*b*. In the course of drawing the channels toward one another the oppositely directed inclined planes on the lower sidewall of respective channels 42*a* and 42*b* engage the bosses 54 on lower flange 24*b* and drive the housing parts together about hinge 12*c* into the gasket 26, as previously described. Instead of opposed cams on aligned channels a single channel with cams structured in the same direction may be used. In such case means to move the channel and to hold in position will be needed. Various alternative ways of clamping the flanges together or otherwise moving the edges of the housing parts against the gasket will occur to those skilled in the art. Where no hinge exists between the housing parts it may be desirable to employ similar flange structures on both sides of the housing with separate channel clamps along each edge.

Figure 8A:
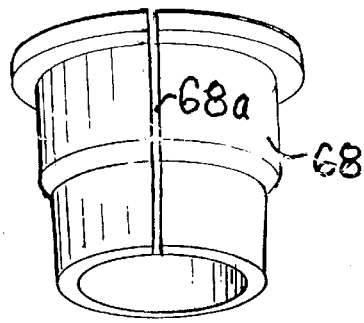
FIG. 8a shows an enlarged perspective view of the insert grommet isolated from other structures shown in FIG. 8.
Figure 8:
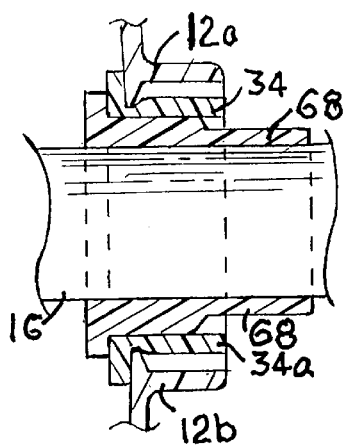
FIG. 8 is an enlarged partial sectional view showing how a cable passes through holes in the housing provided therefore through an integral grommet in a gasket in a snugly received coaxial insert grommet between the grommet and the cable.

FIG. 1 shows a situation where there are four cable openings at each of the respective ends and only three cables, at each end. In such a situation the cable holes must be filled so that the insulating fluid which is used to fill the housing will not be lost. Similarly when the holes are too large for the cables, means must be provided to partially fill up the holes in the housing to prevent leakage from around the outsides of the cables, or to block the hole if no cable is to pass through it in a particular housing. One solution to these problems is shown in FIGS. 8, 8*a*, 9, and 9*a*. FIG. 8*a* shows an intermediate rubber grommet 68 with a slit 68*a* in it which allows a cable to be slipped laterally into the grommet. The cable and intermediate grommet may, in turn, be slipped laterally into the appropriate tubular grommet of the closure end 34 of the gasket 26 through its slit 34*a*. In each case the slit involved will be closed by the pressure imposed on the resilient members involved. FIG. 8*a*, in fact, exaggerates the slit which it normally not visible as an opening. Another smaller separate grommet within a grommets in an end array of a gasket may be used with smaller cables, with multiple grommets added until a proper size for the fit is achieved for a particularly small cable.

Figure 9:
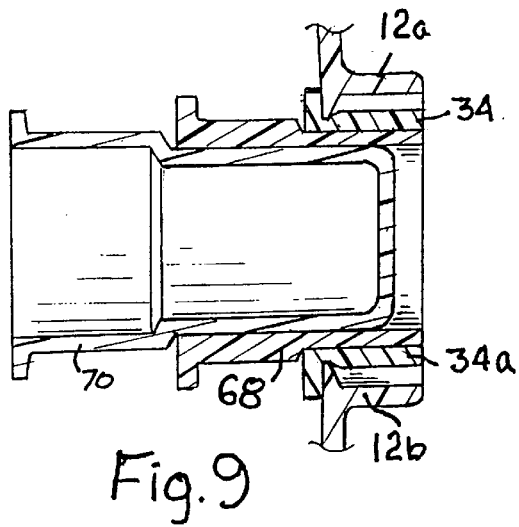
FIG. 9 is a view similar to FIG. 8 somewhat further enlarged showing an insert grommet partially inserted and an insert plug with a closed end used to retaining fluid with the housing inserted within the insert grommet in place of a cable.

In a case where no cable passes through the tubular opening of the end piece 34, that opening needs to be closed and can be closed by a cup-like member 70 shown in FIG. 9 which has a bottom 70*a*. As seen in FIG. 9 the cup-like member 70 may be inserted into the grommet 68 in place of a further grommet and actually block the hole so that fluid can be poured into the housing and not flow out the opening, especially as pressure is applied.

Port openings are provided at opposite ends of the housing piece 12*a* by integral molded tubular protrusions 72*a* and 72*b* of cylindrical form extending upwardly from the closed housing as seen in FIG. 1. The cylindrical port openings are arranged to have a generally vertical axis in the closed position of the housing as seen in FIG. 1. They have a very short extension of the cylindrical tubular wall opening at the mid-point but the extension above the housing part 12*a* increases as the lateral distance increases away from the mid-point. Also between the cylindrical ports 72*a* and 72*b* on the upper housing portion 12*a* are reinforcing ribs 73*a* and 73*b* on each side of each port as seen in FIG. 5. The ports at each end allow liquid polyurethane rubber or other fluid filler and impregnation material to be poured into the housing filling it and totally immersing the splice and cable. The ports must be closed, of course, and this accomplished by a relatively rigid cup-like closure member 74*a* and 74*b*. This cup-shaped closure member is covered with resilient rubber-like sealing material 76 which will seal fluid tight with the port's cylindrical inside wall to 72*a* or 72*b*. The outside surface of relatively rigid cup closure number 74*a* as seen in FIG. 6 is provided with teeth formed in the molding process to aid in holding in place rubber-like cover 76*a* as its surface is urged upward by engagement with the port 72*a*. Molded as an integral part of the hollow inside of a housing portion 12*b* are a pair of bushings 78*a* and 78*b* each of which snugly accommodate a bolt 80 to engage the closure 74*a* and 74*b*. Bolt 80 is engaged in an integrally molded outward projecting socket 79 which conforms to the flat faces on the sides of the bolt head to hold the bolt 80 against rotation. Between the head of the bolt and the housing part 12*b* is an O-ring 81 to seal the opening into the housing at the bottom of the bushing. The bolt extends upward to a position where it will pass through a snug opening in the bottom of cup 74*a*, 74*b*. Molded into the cup 74*a*, 74*b* is a tubular stub 75*a*, 75*b*, the top surfaces of which provide a bearing surface for pressure applied by a nut rotatably engaging the threads on the end of bolt 80 after the cup 74*a*, 74*b* has been put in position as shown in FIG. 5. The inside surface of tubular stub 75*a*, 75*b* is provided with flutes or radial narrow ribs that permit fluid to flow up the stub to the nut 82 and fill the space and seal it against leakage in the final position of the cup 74*a* seen in FIG. 6.

It will be understood that the filling port cylinders 72*a*, 72*b* are filled to their tops in order to exclude air. The closure cup 74*a*, 74*b* with its resilient cover 76*a*, 76*b* is put into the position shown in FIG. 5 so that the cup bottom rests against insulating fluid excluding air. When both cups are in place the respective nuts 82 are tightened so that the resilient cover 76*a*, 76*b* seals against the inside of the cylindrical port 72*a*, 72*b*. Thereafter, as the individual nuts 82 are tightened, cups 74*a*, 74*b* move to the position shown in FIG. 6 or something approximating that position. The cups and their covers are acting as a piston or plunger moving into an incompressible fluid. Therefore as the cups move inwardly the pressure of the fluid is increased causing the fluid to be forced into all voids, and particularly those in the cable and splice.

The design ideally will produce a pressure something on the order of 15 pounds above atmospheric pressure when both cups are in the position of FIG. 6. Since the adequacy of the pressure should be known, some form of pressure gage indicator is desirable to detect when the desired pressure is achieved. In accordance with the present invention, either a portion of a housing 12*a* or 12*b* or a portion of a closure cup 74*a*, 74*b* is provided a region which is designed to yield before other parts of the housing or seals would leak, yield or rupture. A preferred gauge is designed to form into outwardly projecting bubble 84 as seen in FIG. 6. Since the insulating liquid remains fluid throughout the process normally only one gage is required but in order to be uniform in the product both cup closures 74a, 74b may be provided with such a gage.

Preferably the insulating fluid employed for filing the housing and impregnating the voids and crevices in the splice is of a type which will solidify after pressurization. Yet, if trouble develops in the splice, it will be possible to disassemble the splice by, opening up the housing and removing the enclosed splice and breaking away the solidified insulating material. Since the splice may be accessed easily and cleaned-up and repaired as needed, the housing may also be cleaned out and the hardened insulation broken away so that it may be re-used again essentially the same way it was in the first instance. It is believed that the housing of the present invention will be useful and effective splice enclosure for many years and because water is so effectively excluded will substantially reduce the incidence of failures within the splices.

Figure 10:
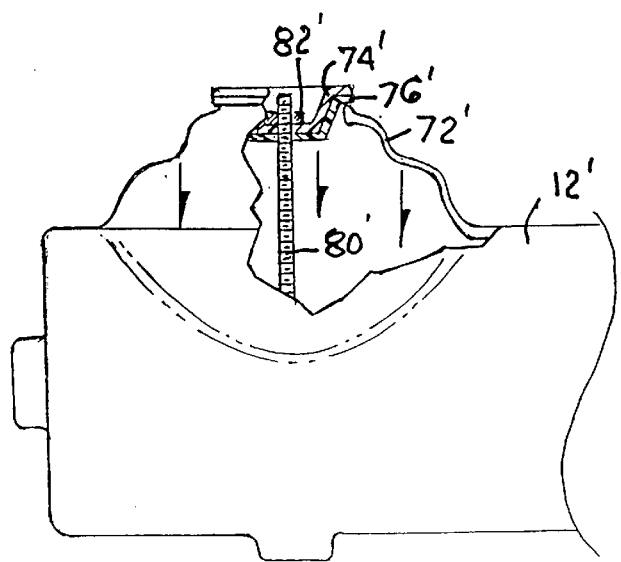
FIG. 10 is a partial sectional view showing of one end of a housing similar to that of FIGS. 1 to 6 employing a modified form of filling port.
Figure 9A:
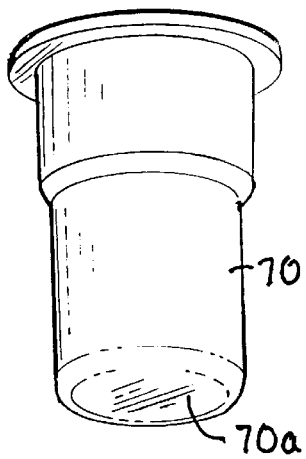
FIG. 9a shows a further enlarged perspective view of the plug shown in FIG. 9 isolated from other structure.

Referring now to FIG. 10 an alternative type of port construction is shown, somewhat schematically. The housing structure, although not shown in detail, is presumed to be similar, made of molded resinous material such as polypropylene and divided advantageously into halves, preferably with the connecting integral hinge along one edge as shown particularly in FIGS. 2 and 5. Here the enclosure housing is designated 12'. However, in this case instead of a cylindrical port structure molded integrally with the housing, it has provided at least one port structure 72' with a somewhat modified type of cup cap enclosure. A molded resinous cup 74' and a resilient outer cover of rubber 76' or other elastomeric material for sealing . A bolt 80' and nut 82' arrangement quite similar to that employed in the prior embodiment is also advantageously employed. In this case the port is a structure having a relatively flexible wall 72' integrally molded with the housing but capable of being deformed by tightening the bolt 82' to draw down the cup 74' and a rim which rests atop the edge of the opening in the wall 72'. As the cup moves downward, the wall 72' is deformed inwardly and is of such shape as to be subject to some deformation which is absorbed by the convoluted surface thereof. Ultimately, the wall may be entirely drawn into the housing body as shown in dot and dash lines in FIG. 10. In the process of the operation shown, internal pressure of the insulating fluid within and completely filling the housing is increased, therefore diminishing the housing volume, will cause the pressurized fluid to flow into voids and crevices, completely excluding air from the area of the splice.

FIG. 10 is just one possible alternative pressurizing means. Other alternative devices for accomplishing this purpose will occur to those skilled in the art.

Figure 11:
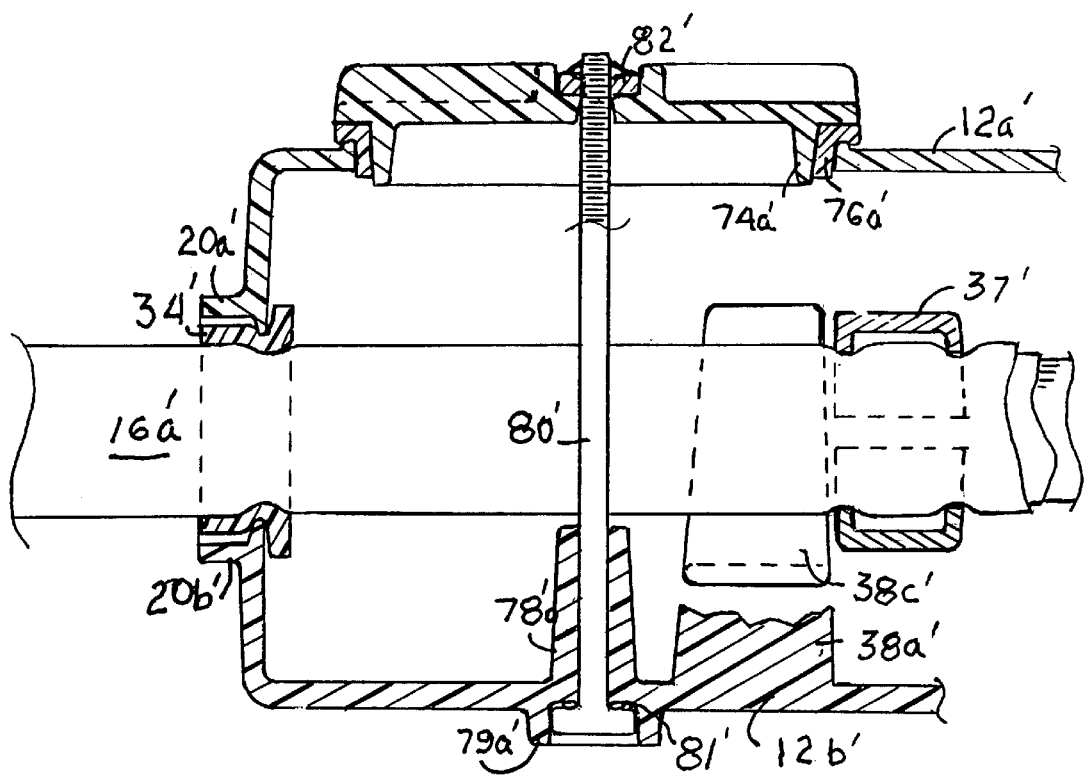
FIG. 11 is a partial sectional view similar to FIG. 6 showing alternative clamp and closure structures.
Figure 12:
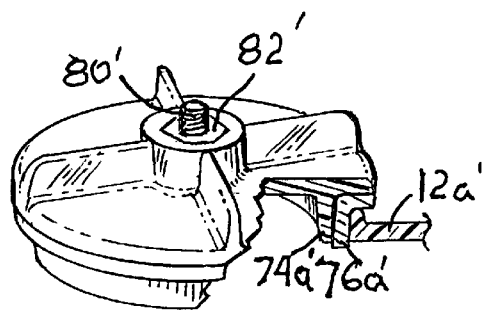
FIG. 12 is a partial perspective view, partially in section showing the alternative closure of FIG. 11 from above.

FIG. 11 shows a sectional view similar that of FIG. 6 with a somewhat modified structure. Corresponding parts are designated with corresponding numbers but with the addition of double primes. As the housing parts 12a" and 12b" engage and are sealed against the gasket. Only the grommet portion 34' of which between the scalloped edges 20a" and 20b" is seen. It will be understood that the structure is held together by clamp means, as in FIG. 5, for example. In this case the cables are held in place with tension relieving clamp member 37" and cable 16a' which engages the dividers 38a" and 38c" in this specific case so that the tendency to pull the cable out of the housing is resisted further by the clamp 37'.

The closure in this case 74a" is a flat cap closure resting atop the port in housing part 12a". In this case the closure has a sub-cylindrical rim 74a" covered by resilient sealing covering 76a" are inserted within the port opening. The closure 74" is not intended to be drawn into the housing but merely held in place by the bolt 80' engaging nut 82' in the sockets provided for them such as 79a". A sealing O-ring gasket 81" is also employed under the head of the bolt. Structure like this may be used where the splice enclosure is suspended from overhead lines or placed in a dry manhole, not covered by dirt.

In addition to alternatives for the pressurizing devices and for the housing enclosure means there are many possible variation in the structure shown within the scope of the invention. claims are intended to be within the scope of the invention all possible variations which will occur to those skilled in the art.

I claim:

1. A telephone line splice enclosure for excluding moisture from an enclosed splice comprising;

a two part hollow housing, one of the housing parts having at least one port, enabling the housing to be filled with insulating fluid, the two parts having opposed relatively narrow cooperating edges around the entire periphery of each housing part, closing together for enclosure of a splice of multiple telephone lines in two or more cables passing through cable openings provided at the narrow edges at ends of the housing and shaped to accommodate said cables;

an elastomeric resilient gasket designed to fit between the narrow cooperating edges of the two housing parts, including integral tubular grommets at the cable openings, for accommodating passage of the cables and sealing against plugs or the cables; said gasket extending around the full periphery of the cooperating edges, being broader than the narrow cooperating edges, such that a compression of the broader gasket pinched between the cooperating narrow edges seals together the two parts of the housing, said grommets presenting sealing surfaces generally normal to said narrow end edges at the cable openings shaped to conform to the cables, which engage and compress said sealing surfaces so that a seal is made by pinching said groummets between the end edges at the openings in such a way that axial forces are not imposed on the cables; and clamp means bearng against the housing parts and urging them together and into the gasket to complete the seal.

2. The splice enclosure of claim 1 in which the edges of the two parts of the housing conform to one another and are opposed to one another even at the cable openings which openings conform to the grommet sealing surfaces and present said narrow end edges opposed to one another around the periphery of each opening which bear on and deform the gasket from both sides and around the gasket periphery and thereby complete the seal around the entire housing.

3. The splice enclosure of claim 2 in which each of the housing parts has integrally molded with the housing an essentially rigid flange spaced laterally from the end edges of the housing where sealin occurs, such that the flanges on the respective parts lie parallel to one another when said housing parts are closed and the clamp means acts through the flanges to seal the housing parts against the gasket.

4. The splice enclosure of claim 1 in which the clamp means completes the seal through said at least one port in the housing, which at least one port is provided with closure means, such that the closure means may be drawn into the port while maintaining a seal with the port, thereby causing housing volume to decrease in order to increase pressure on the insulating fluid filling the housing to force the fluid into crevices and other unfilled spaces within the housing and splice.

5. The telephone line splice enclosure of claim 1, in which within the housing enclosure are posts affixed to at least one housing part which closely confine and guides the cables to the splice area and at least a pair of spliced cables in place within the housing, have clamped to their outer diameter an enlarged diameter member abutting at least one of the confining and guiding posts to resist axial pull on the cables in the direction to break splices.

6. An elastomeric resilient gasket for sealing together two parts of a hollow housing, said gasket comprising, first relatively flat parts of the gasket arranged generally in a plane to fit between opposed edges of the two housing parts, transverse to and relatively narrower than the opposed edges of the housing parts so as to be pinched thereby to create a seal between the opposed housing edges, and second parts comprising cable receiving grommets shaped internally to snugly accommodate a cable and externally to provide only inward forces acting generally in a plane from the compression of the compression of the closed housing interconnecting with the first parts and adjacently with each other to make a continuous loop, the grommets being designed to accommodate intrusive pieces, which must enter the housing through openings in the opposed edges of the housing that conform to the periphery of the grommets which provide slits for lateral access into and out of each grommet for each intrusive piece from the same side of the gasket, and to permit the gaskets to be opened to insert the intrusive pieces into their respective grommets, will be closed by pressure from the housing end edges which are shaped to conform to the shape of the grommets and the gasket is continuous so that a good seal is provided around the entire housing.

7. The gasket of claim 6 in which intermediate grommets are placed one at a time around each intrusive piece or in successive layers around each other and around each intrusive piece so that the intermediate grommet closest to the gasket grommet will make a good seal thereto and the other intermediate grommets will make good seals to one another and to the intrusive piece.

8. The gasket of claim 6 in which said grommets are arranged generally in parallel with one another and immediately adjacent to one another at each end of the gasket, such that the grommets are connected to one another to provide continuity and in such a way that the entire structure provides surfaces generally normal to the opposed housing edges at the point of contact and may be clamped between opposed housing edges and sealed thereto.

9. The method of assembling a telephone cable splice enclosure for excluding moisture comprising, assembling cables which are fitted into their respective grommets in a continuous elastomeric gasket, including said grommets, through lateral slits into said grommets so that each individual cable fits snugly within its respective grommet, and filling any unfilled grommets with plugs, and mounting the elastomeric resilient gasket on narrow peripheral edges of a first of two hollow housing parts, with the grommets resting in conforming parts at cable openings and the entire gasket resting atop the narrow peripheral edges which extend around the full periphery of the first housing part, moving the second housing part into position against the gasket so that the grommets rest on conforming narrow end edges provided in cable openings of the second housing part and the narrow peripheral edges extending around the periphery of the second housing part engage the gasket and are opposed to the narrow edges of the first housing part, and applying clamp means to press the housing parts together and urge them together and pinch the gasket throughout the length, both at the narrow peripheral edges and at the grommets to complete the seal between the housing parts.

10. The method of claim 9, adding the further step of filling the housing full of insulating fluid to the top of ports, and placing port closures over the ports and the insulating fluid so as to exclude air from the housing.

11. The method of claim 10 adding the further step of applying force to the port closures to draw them into the ports to increase the internal pressure on the insulating fluid and cause the insulating fluid to fill all voids in the cables and splice.

12. The method of claim 11 adding the further step of monitoring pressure through a pressure gauge until the required pressure is achieved.

13. A telephone line splice enclosure for excluding moisture from the enclosed splice comprising;

a two part hollow housing, one of the housing parts having at least one port, enabling the housing to be filled with insulating fluid, the two parts fitting together for enclosure of a splice of multiple lines from two or more cables passing through cable openings at end edges of the housing to accommodate said cables;

an elastomeric resilient gasket designed to fit between the end edges of the two housing parts and extending around the full periphery of the end edges, such that a compression of the gasket between the end edges of the two parts of the housing seals the housing, and said gasket, including integral tubular grommets at the cable openings at the housing end edges, being shaped for accommodating passage of the grommets and sealing to the grommets and causing the grommets to seal to plugs and the cables within the grommets;

clamp means urging the housing parts together and into the gasket to complete the seal;

said at least one port provided with closure means such that the closure means may be drawn into the port while maintaining a seal with the port causing housing volume to decrease in order to increase pressure on insulating fluid filling the housing to force the fluid into crevices and other unfilled spaces within the housing and splice, connection means between the closure means and the housing part opposite the closure means, including means to actuate the connection means to draw the closure means into the port, thereby increasing pressure on the fluid contained in the housing to force the fluid into all the crevices within the housing.

14. The splice enclosure of claim 13 in which the closure means is a piston-like member in the port in one of the opposed housing parts and connected to the other opposed housing part by a nut and bolt connection between the closure means and the opposed housing part, such that tightening the connection pulls the closure means further toward the housing part opposed to the piston-like member and into the port to increase the fluid pressure.

15. The splice enclosure of claim 14 in which the port is a tubular port having an axis transverse to its supporting housing wall and the closure means is a cup shaped piston which generally conforms to the cross-sectional shape of the tubular port and continues making sealing contact with the tubular port as the cup piston is drawn into the port.

16. The splice enclosure of claim 15 in which the closure means is cup shaped and has an outer surface layer of resilient elastic material which improves the seal against the port opening.

17. The splice enclosure of claim 16 in which the cup shaped piston is molded of resinous material and its outer sidewall surface is provided with integral surface features engaging the outer layer of resilient elastic material to help hold the outer layer in place.

18. The splice enclosure of claim 16 in which the closure means is a cup and a gauge for detecting pressure is placed in the bottom of the cup to shield it from damage, particularly should the splice enclosure be buried.

19. A splice enclosure of claim 18 in which the gauge in the bottom of the cup is a bubble gauge serving as a part of the cup bottom wall such that when the pressure of the insulating fluid is sufficient in accordance with design criteria the fluid will cause a bubble of the gauge material to bow outwardly.

20. The splice enclosure of claim 16 in which a hole is provided in the the bottom of the cup closure member which is covered with a layer of resilient elastic material such that when the pressure of the insulating fluid is sufficient it will cause the elastic material to bow outward into the cup.

21. The splice enclosure of claim 15 in which the piston-like member is cup shaped and a boss is provided inside the piston providing a planar upper surface generally parallel to the cup bottom against which the flat face of said nut can rest as the nut is engaged by a tool and turned to apply pressure urging the cup into the port.

22. The splice enclosure of claim 14 in which the bolt extends through to an external part of the housing through a boss opposed to the port and with which said boss is integral, said boss engaging the bolt against turning as the nut is tightened.

23. The splice enclosure of claim 22 in which another boss is provided on the piston-like member providing a flat external surface against which a flat face of said nut rests as the nut is engaged by a tool and turned to apply pressure between the closure means and the opposed part of the housing.

24. The splice enclosure of claim 23 in which the boss on the piston-like member providing the flat surface is located within the cup of a cup closure.

25. The splice enclosure of claim 23 in which the boss on the piston-like member has spaced flutes around the circumferences of the bore of the boss to space the bolt away from the bore whereby there will be room for the fluid to be forced into the crevices and against the nut and bolt connection part resting atop the boss.

26. The splice enclosure of claim 22 in which an O-ring seal is included around the bolt and against the boss to prevent leakage around the bolt through the hole in the boss on the housing part opposite the piston-like member.

27. The splice enclosure of claim 6 in which the bolt extends through a boss on the housing part opposite the piston-like member, and said boss is designed to engage and hold opposed flat faces on the head of the bolt against turning as the nut and bolt are tightened.

28. A telephone line splice enclosure for excluding moisture from the enclosed splice comprising;
   a two part hollow housing, in which the two parts of the housing are composed of resinous moldable material, at least one fluid filling port on one housing part, the two parts fitting together for enclosure of a splice of multiple telephone lines provided from two or more cables passing through cable openings provided at sealing edges of the housing to accommodate said cables, and each of the housing parts having an essentially rigid flange spaced from the sealing edge such that the flanges on the two parts lie generally parallel to one another when the housing parts are closed;
   a continuous elastomeric resilient gasket designed to fit between the sealing edges of the two housing parts and extending around the fill periphery of the sealing edges, such that a compression of the gasket between the two parts seals the housing, said gasket including integral tubular grommets at the cable openings at the housing sealing edges shaped and sized for accommodating the cables passing through the grommets while sealing to the grommets and causing the grommets to seal to plugs and the cables within the grommets;
   clamp means acting on the flanges to urge the housing parts together and into the gasket to complete the seal, and
   fluid pressurizing means including fluid tight piston means in at least one port opening and externally actuated means acting between the housing and the piston to impose pressure on the fluid sufficient to force the fluid into the spaces between wires of the cables.

29. A telephone line splice enclosure for excluding moisture from the enclosed splice comprising;
   a two part hollow housing made of molded resinous material, one of the parts having at least one fluid filling port, enabling the housing to be filled with insulating fluid, the two parts fitting together for enclosure of a splice of multiple telephone lines provided from two or more cables passing through cable openings provided at end edges of the housing to accommodate said cables, in which the end edges of the two parts of the housing conform to one another and are opposed to one another, even at the cable openings, and one of the housing parts is provided with a thinner wall portion so designed that, when the pressure upon the enclosed insulating fluid within the housing is sufficient, the thinner wall portion will bow outward as an indicator of sufficient internal pressure to fill any voids in the splice and elsewhere within the housing;
   an elastomeric resilient gasket designed to fit between the end edges of the two housing parts and extending around the full periphery of the cooperating edges, such that a compression of the gasket between the two parts seals the housing, said gasket including integral tubular grommets at the cable openings at the housing end edges shaped and sized for accommodating the cables passing through the grommets while sealing to the grommets and causing the grommets to seal to plugs and the cables within the grommets; and
   clamp means acting on the flanges to urge the housing parts together and into the gasket to complete the seal.

30. A telephone line splice enclosure for excluding moisture from the enclosed splice comprising;
   a two part hollow housing in which the two parts of the housing are composed of resinous moldable material, one of the parts having at least one fluid filling port, the two housing parts being attached to one another by an integral flexible hinge of the same resinous material as the housing, the two parts fitting together for enclosure of a splice of multiple telephone lines provided from two or more cables passing through cable openings provided at sealing edges of the housing to accommodate said cables, each of the housing parts having an essentially rigid flange spaced from sealing edge on the opposite side of the housing hinge such that the flanges on the two parts lie parallel to one another when the housing parts are closed, and the outer surface of each of the housing parts is provided with outwardly projecting ribs molded integrally with the housing parts as added reinforcement and impact resistance;

an elastomeric resilient gasket designed to fit between the sealing edges of the two housing parts and extending around the full periphery of the sealing edges, such that a compression of the gasket between the two parts seals the housing to the gasket, said gasket including integral tubular grommets at the cable openings at the housing end edges shaped and sized for accommodating passage of the grommets while sealing to the grommets and causing the grommets to seal to plugs and the cables;

clamp means acting on the flanges to urge the housing parts together and into the gasket to complete the seal, and fluid pressurizing means including fluid tight piston means in at least one port opening and externally actuated means acting between the housing and the piston to impose pressure on the fluid sufficient to force the fluid into the spaces between wires of the cables.

31. A telephone line splice enclosure for excluding moisture from the enclosed splice comprising;

a two part hollow housing in which the two parts of the housing are composed of resinous moldable material, the two housing parts being attached to one another by a hinge allowing opening and closing of the housing, one of the parts having at least one fluid filling port, the two parts fitting together for enclosure of a splice of multiple telephone lines provided from two or more cables passing through cable openings provided at the sealing edges of the housing to accommodate said cables, each of the housing parts having an essentially rigid flange spaced from sealing edge such that the flanges on the two parts lie parallel to one another when the housing parts are closed;

an elastomeric resilient gasket designed to fit between the sealing edges of the two housing parts and extending around the fill periphery of the sealing edges, such that a compression of the gasket between the two parts seals the housing to the gasket, said gasket including integral tubular grommets at the cable openings at the housing end edges shaped and sized for accommodating passage of the grommets while sealing to the grommets and causing the grommets to seal to plugs and the cables;

clamp means acting on the flanges to urge the housing parts together and into the gasket to complete the seal, and fluid pressurizing means including fluid tight piston means in at least one port opening and externally actuated means acting between the housing and the piston to impose pressure on the fluid sufficient to force the fluid into the spaces between wires of the cables.

32. The splice enclosure of claim 31 in which the hinge is attached to housing parts offset somewhat from the housing sealing edges and given sufficient space between the hinge and the housing to include a part of the gasket therein.

33. The splice enclosure of claim 32 in which the enclosure is in the form of an elongated housing with the flanges being rigid close to the sealing edges, and along generally straight sides on the side opposed to the hinge so that the clamp means may be applied to the flanges to hold the housing parts together and squeeze the gasket into scaling contact with the edges of the parts around the entire periphery of the parts.

34. A telephone line splice enclosure for excluding moisture from the enclosed splice comprising;

a two part hollow housing in which the two parts of the housing are composed of resinous moldable material, one of the parts having at least one fluid filling port, the two parts fitting together for enclosure of a splice of multiple telephone lines provided from two or more cables passing through cable openings provided at sealing edges of the housing to accommodate said cables, each of the housing parts having at least one essentially rigid flange spaced from the sealing edges such that the flanges on the two parts lie parallel to one another when the housing parts are closed;

an elastomeric resilient gasket designed to fit between the sealing edges of the two housing parts and extending around the full periphery of the sealing edges, such that a compression of the gasket between the two parts seals the housing to the gasket, said gasket including integral tubular grommets at the cable openings at the housing sealing edges shaped and sized for accommodating passage of the grommets while sealing to the grommets and causing the grommets to seal to plugs and the cables; and clamp means acting on each pair of close spaced parallel flanges to pull the housing parts together and into the gasket to complete the seal, comprising at least one channel to embrace both of the flanges and on the inside of at least one sidewall of each channel are periodically spaced members which engage similarly spaced periodic members on the outer surfaces of one of the flanges opposed to that sidewall such that, at least one of each pair of engaging members provides cam surfaces which, in cooperation with the opposed members applies pressure to the flanges to urge the flanges together along with the housing parts so that the housing edges will be urged into sealing engagement with the gasket.

35. The splice enclosure of claim 34 in which along each pair of the flanges there are two channel shaped clamp means having oppositely directed cam surfaces, the two channels arranged in line with one another but separated when placed in position over the pair of flanges, means drawing the channel members together in which process the cams are engaged and the housing edges are urged into sealing the engagement with the gasket.

36. The splice enclosure of claim 34 in which indexing means is provided on the housing and on the channel clamps to properly position the channel clamps so that the cooperating members acting to clamp the structure miss one another as the channels are put in place.

37. The splice enclosure of claim 36 in which the indexing means are pins with enlarged heads fixed to one of the housing parts which fit through enlarged openings the enlarged in each channel clamp bottom opening being extended in the direction opposite from channel movement by a narrow slot to embrace the pin permitting that channel to be moved in the direction to engage the cams.

38. The splice enclosure of claim 34 in which the outer surface of at least one of said flanges is provided with periodic spaced cam means and coopering means on the inner sidewall of the clamp means to enhance sealing the gasket.

39. A telephone line splice enclosure for excluding moisture from the enclosed splice comprising;

- a two part hollow housing, in which the two parts of the housing are composed of resinous moldable material, the two parts of the housing being attached to one another by an integral flexible hinge of the same resinous material as the housing and being attached to the respective housing parts at positions spaced from sealing edges and providing clearance at the connected edges to one of the parts having at least one fluid filling port, the two parts fitting together for enclosure of a splice of multiple telephone lines provided from two or more cables passing through cable openings provided at the sealing edges of the housing to accommodate said cables, and each of the housing parts having an essentially rigid flange spaced from the sealing edge such that the flanges on the respective parts lie parallel to one another when the housing parts are closed;
- an elastomeric resilient gasket designed to fit between sealing edges of the two housing parts and extending around the full periphery of the sealing edges, such that a compression of the gasket between the two parts seals the housing to the gasket, said gasket including integral tubular grommets at the cable openings at the housing sealing edges, which openings are shaped and sized for accommodating passage of the grommets while sealing to the grommets and causing the grommets to seal to plugs and the cables; and
- clamp means comprising at least one channel to embrace each pair of parallel flanges when the housing is closed against its gasket, wherein on the inside of at least one sidewall of each channel are periodically spaced members which engage similarly spaced periodic members on the outer surfaces of one of the flanges opposed to that sidewall such that, at least one of each pair of engaging members provides a cam surface which, in cooperation with the opposed member applies pressure to the flange thereby urging the housing parts together so that the housing edges will be urged into hermetically sealing engagement with the gasket.

40. The method of constructing a water-proof splice enclosure comprising, completing splices between individual wires in two or more cables, providing a hollow housing to contain the splice, which housing permits entry of the cables into the housing at selected locations and allows filling of the housing with fluid,

- providing sealing means around each of the cables and between housing parts,
- clamping the housing parts together so that the sealing means between them and around the cables provide fluid tight hermetic seals able to withstand fluid pressure to be applied,
- filling the housing with insulating fluid,
- closing all filing ports,
- applying pressure to the fluid internal of the housing through a movable piston in a cylinder in one housing port and means connected between the piston and the housing to move the piston inward in order to drive the insulating fluid into the small interstices between wires and elsewhere, including any voids or movable regions around sealing means, whereby no space is available for penetration of water or other unwanted fluids.

41. The method of constructing the waterproof enclosure of claim 40, in which the fluid employed is selected from materials that will become or can be made to become solid once in place and under pressure in which as a further step the fluid is caused or allowed to become solid.

* * * * *

UNITED STATES PATENT AND TRADEMARK OFFICE
CERTIFICATE OF CORRECTION

PATENT NO. : 6,218,620 B1
DATED : April 17, 2001
INVENTOR(S) : Michel, John M.

It is certified that error appears in the above-identified patent and that said Letters Patent is hereby corrected as shown below:

Column 1,
Line 53, change "part" to -- parts --.

Column 2,
Line 10, change "and" to -- an --;
Lines 37-38, change "draws fastener draws" to -- draws --;
Line 46, cancel the period (.) and "The" substitute -- the --, and after "gauge" insert -- of --;
Line 47, cancel "forced" and substitute -- is designed --, and change "by" to -- under --;
Line 58, after "that" insert -- each detector --;
Line 62, change "spice" to -- splice --.

Column 3,
Lines 35-36, cancel "within the conductor with" and substitute -- , the --.

Column 4,
Line 20, change "retaining" to -- retain --;
Line 56, cancel "22c and 22d";
Line 63, change "Fig. 1" to -- Fig. 3 --;
Line 64, after "16d" insert -- and 18a, 18b, 18c and 18d --.

Column 5,
Line 24, after "26b" cancel the period and insert -- producing a good seal --;
Line 37, change "grove" to -- groove --;
Line 67, after "As seen" insert -- in --.

Column 6,
Line 23, change "shaped" to -- shape --;
Line 33, change "offjunctions" to -- off junctions --;
Line 38, after "shown" insert -- in --;
Line 43, after "may" insert -- be --.

UNITED STATES PATENT AND TRADEMARK OFFICE
CERTIFICATE OF CORRECTION

PATENT NO. : 6,218,620 B1
DATED : April 17, 2001
INVENTOR(S) : Michel, John M.

It is certified that error appears in the above-identified patent and that said Letters Patent is hereby corrected as shown below:

Column 7,
Line 1, delete "if";
Line 5, change "opening" to -- openings --;
Line 55, change "it" to -- is --.

Column 8,
Lines 2 and 7, delete "tubular";
Line 20, delete "cylindrical";
Line 34, change "cup" to -- cups --;
Line 62, change "gage" to -- gauge --.

Column 9,
Lines 3 and 5, change "gage" to -- gauge --;
Line 6, change "filing" to -- filling --;
Line 17, before "useful and effective" insert -- an --;
Line 54, after "similar" insert -- to --.

Column 10,
Line 12, change "variation" to -- variations --;
Line 13, change "claims" to -- Claims --.
Line 18, change the semi-colon (;) to a colon
Line 58, change "sealin" to -- sealing --.

Column 11,
Line 22, delete "of the compression";

Column 13,
Line 25, cancel "the" (first occurrence).
Line 59, change "6" to -- 22 --.
Line 13, change "fill" to -- full --.

Column 15,
Line 46, change "fill" to -- full --.

UNITED STATES PATENT AND TRADEMARK OFFICE
CERTIFICATE OF CORRECTION

PATENT NO. : 6,218,620 B1
DATED : April 17, 2001
INVENTOR(S) : Michel, John M.

It is certified that error appears in the above-identified patent and that said Letters Patent is hereby corrected as shown below:

Column 16,
Line 4, change "scaling" to -- sealing --.
Line 65, change "coopering" to -- cooperating --.

Column 18,
Line 21, change "filing" to -- filling --.

Signed and Sealed this

Twenty-eighth Day of May, 2002

Attest:

JAMES E. ROGAN
*Attesting Officer*   *Director of the United States Patent and Trademark Office*